Sept. 29, 1959    W. L. ACKER, JR    2,905,998
AUTOMATIC CHUCKING DEVICE FOR DRILL PIPES AND THE LIKE
Filed Oct. 1, 1957    2 Sheets-Sheet 1

INVENTOR
WILLIAM L. ACKER, JR.
BY Beale & Jones
ATTORNEYS

Sept. 29, 1959   W. L. ACKER, JR   2,905,998
AUTOMATIC CHUCKING DEVICE FOR DRILL PIPES AND THE LIKE
Filed Oct. 1, 1957   2 Sheets-Sheet 2

INVENTOR
WILLIAM L. ACKER, JR.

BY Beale & Jones

ATTORNEYS

United States Patent Office 2,905,998
Patented Sept. 29, 1959

2,905,998
AUTOMATIC CHUCKING DEVICE FOR DRILL PIPES AND THE LIKE

William L. Acker, Jr., Scranton, Pa.

Application October 1, 1957, Serial No. 687,396

16 Claims. (Cl. 24—254)

This invention relates to a chucking device for holding a drill pipe and the like wherein inter-engaging cam jaws act together to force a pipe against fixed jaws.

An object of the invention is to provide a holder for drill rod or drilling pipe and the like which is held against fixed jaws preventing longitudinal and rotary movement of the rod or pipe when a pair of pivotally mounted jaws which inter-engage and have cam surfaces thereon wedge against the pipe to force it against the fixed jaws.

A further object of my invention is to provide a chucking device which may be mounted on a drill rig to hold the pipe extending therethrough and which is adapted to grip and release the pipe while the chuck is rotating.

A further object of my invention is to provide a chucking device for drill pipe and the like in which a pair of pivotal jaws having cam surfaces and lever arms thereon force the pipe against fixed jaws when biasing means disposed between the lever arms of the jaws forces the lever arms away from each other and the cam surfaces clamp tighter against the pipe.

A still further object of my invention is to provide in a chucking device for pipe and the like movable inter-engaging jaws that act against the pipe and are biased always in a direction to grip the pipe and actuating means comprising a fluid piston and cylinder assembly having anti-friction means disposed between the assembly and one of the lever arms of the jaws to move the jaws against the biasing means to release said pipe.

Yet a further object of my invention is to provide in a chucking device for pipe and the like a plurality of fixed jaws for gripping the pipe to restrain it from rotary and longitudinal movement and cooperating pairs of interconnected pivotally mounted jaws associated respectively with the fixed jaws, the pivotal jaws having cam surfaces thereon that grip the pipe and biasing means in the form of spaced apart rings with spring elements therebetween acting in cooperation with the pivotal jaws to force the ring elements that in turn rotate the pivotal jaws always to grip the pipe and with operating means to act against the biasing means to release the grip of the jaws on the pipe.

A still further object of my invention is to provide in a chucking device a plurality of fixed jaws and a plurality of pairs of interconnected pivotal jaws with cam surfaces thereon to grip the pipe and force it against the fixed jaws, said pivotal jaws having arms thereon which are spaced apart and have disposed therebetween annular rings with spring means therebetween pushing the annular rings axially away from each other and toward the lever arms and spaced between two respective pairs of pivotally mounted jaws pivoted equalizer arms which are inter-engaged and have contact with said rings so as to equalize the pressure on said rings.

Still further objects and the entire scope of applicability of the present invention will become apparent from the detailed description given hereinafter. It should be understood, however, that the detailed description and specific example is given by way of illustration only and, while indicating preferred embodiment of the invention, is not given by way of limitation, since various changes and modifications within the spirit and scope of the invention will become apparent to those skilled in the art from this detailed description.

For a more complete understanding of the nature and scope of my invention, reference may be had to the drawings in which.

Throughout the description and the figures of the drawings, like reference numerals and designations refer to similar parts.

Figure 1:
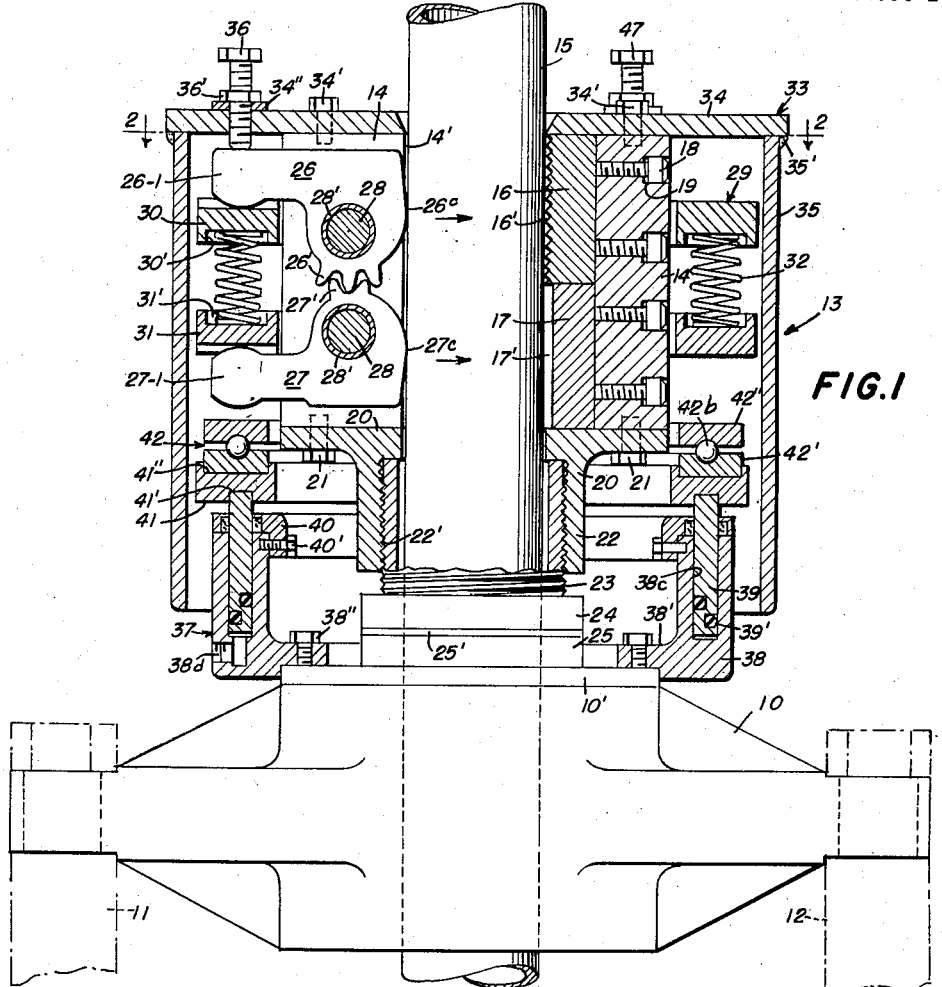
Fig. 1 is a vertical cross-sectional view taken along line 1—1 of Fig. 2 of the chucking device shown as mounted on the top of a top crossarm of a drill rig.

While I have shown in Fig. 1 the chucking device as mounted on top of the top crossarm framework 10 of a drill rig having side posts 11 and 12 shown framentary, the chucking device as generally indicated at 13 may be differently mounted and may be used for not only drill rods and drill pipe but other elongated elements which are to be gripped with a releasable gripping device.

The chuck 13 is made up about an elongated chuck body 14 having an aperture 14' therethrough which receives a typical drill pipe 15. Two slots 14'' are formed in the chuck body 14 and they open into the aperture 14' of the chuck body. In these slots 14'' there extend two side by side fixed jaws 16 and 17 having respective serrations 16' and 17' thereon which extend into aperture 14' of the chuck body to grip the drill pipe 15 to prevent longitudinal and rotary movement thereof. These jaws 16 and 17 are adjustably positioned with respect to the slots 14'' and the aperture 14' in the chuck body 14 by means of setscrews 18 which are received within recessed threaded apertures 19 extending in the chuck body 14 so that the screws may communicate with the recesses 16 housing the fixed jaws. While a drill pipe 15 is shown, this chuck according to this construction may equally as well be used in various machine tools.

In the particular mounting shown, chuck body 14 has a flange collar 20 attached to its base by means of screws 21. Flange collar 20 has an integral neck depending therefrom as at 22 which is interiorly threaded at 22' to receive the exteriorly threaded upper end 23 of a conventional hollow drill spindle. A pair of lock nuts 24 and 25 secures the hollow drill spindle within the cross head 10. Not shown within cross head 10 are conventional antifriction thrust bearings having a top generally indicated at 10' which take up the thrust of the hollow drill spindle 23 that supports flange collar 20. The top only of hollow drill spindle is shown, however, it extends below the cross head 10. In the concept shown in Fig. 2, there are two sets of vertically positioned fixed jaws 16 and 17 arranged at 90 degrees of spacing, and opposite each of those are the rotary cam jaws to be described. Opposite fixed jaw 16 is the cam jaw 26 which is formed with teeth 26' thereon for engagement with teeth 27' on cam jaw 27 opposite fixed jaw 17. Cam jaws 26 and 27 thus inter-engage so that the jaws move together. Each jaw has a cam surface 26c and 27c thereon for engagement with the pipe 15 to force it against the fixed jaws when the increasing radius of cam surface is brought to act against the pipe. In order to mount these jaws 26 and 27 suitable pivot pin mountings 28 are provided in the chuck body and these are equipped with bushings 28' to permit free pivotable movement of the cam jaws. Each cam jaw has a respective outwardly projecting lever arm 26—1 and 27—1 and each is formed with a bearing surface as indicated in Fig. 1 which is spherical. Referring to the cam surfaces 26c and 27c on each of the respective cam jaws 26 and 27, it will be noted that as cam jaw 26 is rotated clockwise, it rotates cam jaw 27 counterclockwise and thus the cam surface 26c is oppositely positioned to the cam surface 27c of cam 27 so that the cam surfaces wedge against the pipe 15 to move it in the direction of the arrows as shown in Fig. 1 to grip and hold it from longitudinal movement as well as rotary movement in the chuck body 14.

In order to urge the cam jaws 26 and 27 into engagement with the pipe 15, a suitable biasing device generally indicated at 29, is disposed between the respective arms or levers 26—1 and 27—1 of the pairs of cams 26—27 which cooperate with the fixed jaws 16—17. This biasing device 29 is made up of an upper annular ring 30 having a depending U-shaped recessed face 30' and a lower ring 31 having a recessed face 31'. Each of these annular rings 30 and 31 has disposed therebetween in spaced-apart position a plurality of vertically extending coil compression springs 32 which are shown compressed at 32 in Fig. 4 when force is applied to release the cam jaws. Thus the biasing action is to set the jaws 26 and 27 into engagement with the pipe 15. The jaws 26 are shown as the upper jaws and a stop must be provided therefor.

Attached to the chuck body 14 is a housing generally indicated at 33 having an apertured top plate 34 received over the pipe 15 and attached to the chuck body 14 at its upper surface by cap screws 34'. Depending from the apertured top plate 34 is a cylindrical skirt 35 which is shown attached at its upper edge to plate 34 as by welding 35'. This skirt 35 is a mere enclosure while the top plate 34 serves as a support for the skirt and also for suitable built-up bosses 34" which are interiorly threaded and receive setscrews 36 having lock nuts 36' thereon. These setscrews 36 are positioned so as to limit the upward swing of the cam jaws 26, as indicated in Fig. 1, and thus the amount of tightening or forcing of pipe 15 up against the fixed jaws 16 and 17.

Figure 4:
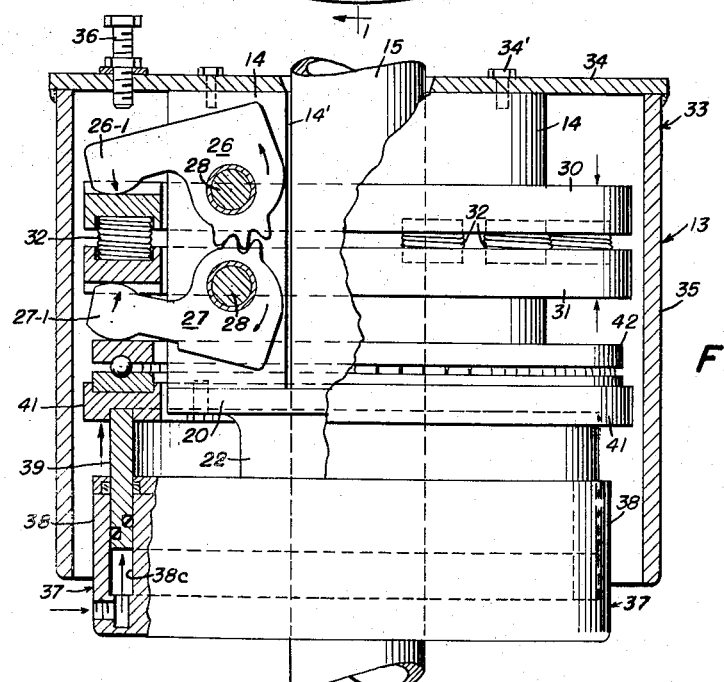
Fig. 4 is a view similar to Fig. 1 with the chuck shown released and withdrawing its grip on the pipe.

Operating mechanism for releasing the cam jaws 26 and 27 or for applying a force opposite to the biasing force of the springs 32 is generally indicated at 37. While it is here shown as a fluid-type of operating means, it may be otherwise. In order for this operating means to act when the chuck 13 rotates anti-friction means are provided between the operating means and the contact with the levers 27—1 of the rotary cams as will be described. In the form shown, an annular cylindrical body 38 having a lower flange 38' attached to the crosshead 10 by cap screws 38" serves as a body within which extending from the top face thereof there is formed a cylindrical cavity 38c and this has a fluid connection as indicated at 38d in Fig. 1 so that fluid pressure may be applied to and released from the cylindrical cavity 38c. Received in the cylindrical body 38c is a cylindrical piston 39 having O-rings 39' thereon at its base to form seals. Piston 39 projects up through the upper face of the cyclindrical body 38 and has a sealing ring with suitable packing as indicated at 40 secured thereto by screws 40'. The annular piston 39 supports an annular ring 41 having a lower recess 41' in the base thereof to receive the piston 39 and an upper recess 41". Received in the annular upper recess 41" is a ball bearing or anti-friction bearing assembly 42 having a lower race 42' and an upper race 42" with ball bearings 42b positioned therebetween in suitable sockets. Thus, force applied by piston 39 upward will move the annular collar 41 upward as well as the bearing assembly 42 and this applies pressure against the lever arms 27—1 at the spherical surface portion thereof as indicated in Fig. 4 to compress the springs 32 and thus move the rings 30 and 31 against the lever arms 26—1 and 27—1 to rotate same and retract the cam surface therefrom from the pipe 15, thereby releasing the pipe. This action takes place while the drill pipe 15 is being rotated and while chuck 13 rotates therewith.

Figure 3:
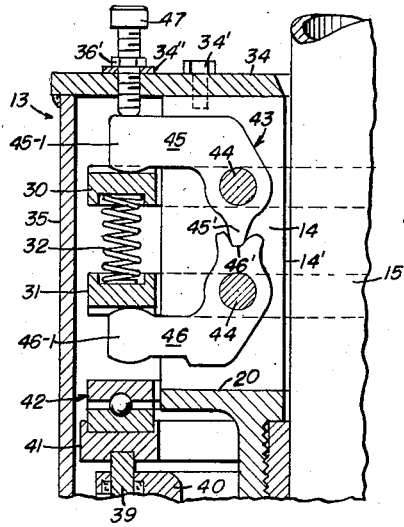
Fig. 3 is a vertical cross section of the equalizer device as taken along section lines 3—3 of Fig. 2 of the chucking device.
Figure 2:
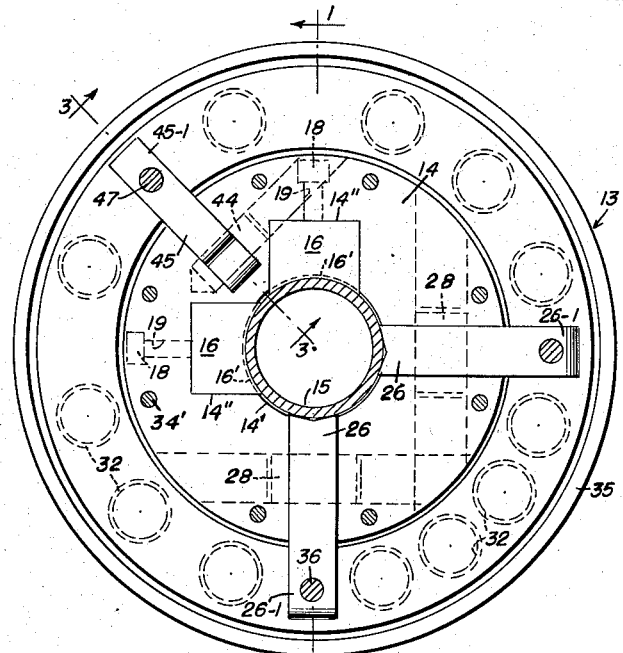
Fig. 2 is a top plan view along line 2—2 of Fig. 1 showing within the chucking device arrangement of fixed jaws, movable jaws and an equalizer opposite to said movable jaws.

In the particular arrangement shown in Fig. 2 there are four coil springs positioned between the two sets of cam jaws 26 which are arranged 90 degrees apart. There are eight additional springs 32 positioned as shown in Fig. 2. In order to provide for equalization of the pressure on the rings 30 and 31 of the biasing device, equalizing pivot arms generally indicated at 43 are provided as shown in Fig. 3. Pivot pins 44 extend within the body of the chuck 14 and support a pair of equalizing cams or lever means 45 and 46. Lever or equalizing cam or arm 45 has a tooth 45' thereon which engages a notch 46' on lever 46. The lever arm 45—1 engages the adjacent upper surfaces of annular ring 30. By this arrangement any force applied to one lever is transmitted to the other so as to rotate towards or away from each other. In order to set the equalization pressure, a setscrew 47, as shown in Fig. 3, is provided in the plate 34 and it is received in the threaded boss 34" and held locked by the lock nut 36'. A safety feature of this chuck is that manual manipulation is afforded for gripping and releasing the pipe or rod material 15 in case of failure of operating means 37 or as an alternative to the use of operating means 37. This safety auxiliary feature is provided in the screws 36 and 47 which may be turned manually by suitably applied wrenches to appropriately rotate or pivot the cam jaws 26 and 27 and the equalizing cams or arms 45 and 46.

In this chucking device there is provided a positive acting gripping of a pipe or rod to prevent longitudinal as well as rotary movement thereof. The chuck is positively set by a constant acting bearing means that is under the control of release mechanism to counteract the biasing action as desired. Equalized gripping forces are always afforded through the interacting rotary pairs of cams, 26—27, and the equalizing arms as shown at 45—1 and 46—1 that are also interacting. While this device is shown as mounted on a drill rig and used with drill pipe and rods, it can be otherwise mounted and used within the scope of my invention.

I claim as my invention:

1. A chucking device for drill pipe and the like comprising in combination a chuck body having a drill pipe receiving aperture therethrough, said aperture having an axis, fixed jaw means mounted in said body and extending into said aperture whereby said pipe may be gripped thereagainst, a pair of pivotally mounted cam jaws in said body and extending into said aperture in a position oppositely disposed to said fixed jaw means, said cam jaws of said pair being mounted on generally parallel pivot axes extending generally transverse to and offset from said axis of the drill pipe receiving aperture, said cam jaws having inter-engagement to pivot together, said cam jaws having cam surfaces thereon which extend into said drill pipe receiving aperture in said chuck body and which are adjacent said pipe to be gripped and when said cam surfaces pivot towards each other by said inter-engagement of the cam jaws, said cam surfaces grip said pipe against said fixed jaw means, biasing means urging said cam jaws to pivot on their pivotal mounting thereby gripping said pipe against said fixed jaw means, stop means for said cam jaws to limit rotary movement thereof in the direction of action of said biasing means, operating means to pivot said cam jaws to release the grip on said pipe.

2. A chucking device for drill pipe and the like comprising in combination, a chuck body having a drill pipe receiving aperture therethrough to receive said pipe, said aperture having an axis, a plurality of fixed jaws mounted in said body and extending into said aperture and against which said pipe may be gripped, a pair of cam jaws pivotally mounted in said body opposite each of said fixed jaws and extending into said aperture, said cam jaws of each pair being mounted on generally parallel pivot axes extending transverse to and offset from said axis of the drill pipe receiving aperture, each pair of cam jaws having inter-engagement to pivot together, each pair of cam jaws having cam surfaces thereon which extend into said drill pipe receiving aperture in said chuck body and which are adjacent said pipe to be gripped and when said cam surfaces pivot towards each other by said inter-engagement of said cam jaws, said cam surfaces grip said pipe against said fixed jaw means, biasing means urging said cam jaws to pivot on their pivotal mounting thereby gripping said pipe against said fixed jaw means, stop means attached to said chuck body for said jaws to limit rotary movement thereof in the direction of action of said biasing means, and operating means to pivot said cam jaws in opposition to said biasing means acting thereon to release the grip on said pipe.

3. A chucking device for drill pipe and the like comprising in combination, a chuck body having a drill pipe receiving aperture therethrough to receive said pipe, said drill pipe having an axis, fixed jaw means mounted in said body and extending into said aperture whereby said pipe may be gripped thereagainst, pairs of pivotally mounted am jaws in said body and extending into said aperture in a position oppositely disposed to said fixed jaw means to grip said pipe against said fixed jaw means, said cam jaws of each pair being mounted on generally parallel pivot axes extending generally transverse to and offset from said axis of the drill pipe receiving aperture, said cam jaws having inter-engagement to pivot together, said cam jaws having cam surfaces thereon which extend into said drill pipe receiving aperture in said chuck body and which are adjacent said pipe to be gripped and when said cam surfaces pivot towards each other by said inter-engagement of the cam jaws said cam surfaces grip said pipe against said fixed jaw means, biasing means urging said cam jaws to pivot on their pivoted mounting thereby gripping said pipe against fixed jaw means, stop means attached to said chuck body for said rotary jaws to limit the rotary movement thereof in the direction of action of said biasing means, rotary mounting means supporting said chuck body for rotation and operating means cooperating with said cam jaws acting in opposition to said biasing means to release the grip on said pipe.

4. A chucking device for drill pipe and the like according to claim 3 wherein said operating means for said cam jaws comprises a rotary member cooperating with said cam jaws to move same while they are rotating with said chuck body in which they are mounted, and force applying means to move said rotary member last mentioned into engagement against one cam jaw of each pair of cam jaws to rotate each pair against said biasing means and causing rotation of each cam jaw to move said cam surface thereon to relax the grip on said drill pipe which has been forced against said fixed jaws.

5. A chucking device for drill pipe and the like according to claim 4 wherein said force applying means to move said rotary member comprises a fluid actuated cylinder and piston assembly having the piston thereof engageable with said rotary member that cooperates with said cam jaws to move same.

6. A chucking device for drill pipe and the like comprising in combination, a chuck body having an aperture therethrough to receive said pipe, said aperture having and axis, a plurality of jaws fixedly mounted in said body and extending into said aperture and against which said pipe may be gripped, a pair of cam jaws pivotally mounted in said body opposite each of said fixed jaws and extending into said aperture, said cam jaws of each pair being mounted on generally parallel pivot axes extending generally transverse to and offset from said axis of the drill pipe receiving aperture, each cam jaw having inter-engagement to pivot together, each cam jaw having a cam surface thereon which is adjacent said pipe to be gripped and on pivoting towards the cam surface on the other cam jaw of its pair grips said pipe against said fixed jaws, biasing means urging said cam jaws to pivot on their pivotal mounting thereby gripping said pipe against said fixed jaws, stop means attached to said chuck body for one of said cam jaws of each pair to limit rotary movement thereof in the direction of action of said biasing means, rotary mounting means supporting said chuck body for rotation and operating means cooperating with said cam jaws to rotate the same to release the grip on said pipe.

7. A chucking device for drill pipe and the like according to claim 6 wherein said operating means for said pivotally mounted cam jaws comprises a rotary member cooperating with said cam jaws to rotate same while they are rotating with said chuck body in which mounted, and force applying means to move said rotary member last mentioned into engagement against one of each of the cam jaws of each pair of cam jaws to rotate same against said biasing means and causing rotation of each cam jaw to move said cam surface thereon to relax the grip on said drill pipe which has been forced against said fixed jaws.

8. A chucking device for drill pipe and the like according to claim 7 wherein said force applying means comprises a fluid actuated cylinder and piston assembly having the piston thereof engageable with said rotary member that cooperates with said cam jaws to move same.

9. A chucking device for drill pipe and the like comprising in combination, an elongated chuck body having an aperture therethrough to receive said pipe, said aperture having an axis, a fixed first jaw secured in said body and projecting into said aperture and having serrations therein to grip said pipe to prevent longitudinal movement, a fixed second jaw secured in said body in vertical alignment with said first jaw and projecting into said aperture and having serrations thereon to grip said pipe to prevent rotation thereof, a pair of cam jaws pivotally mounted in said body and having inter-engagement to rotate together and cam surfaces thereon projecting into said aperture respectively opposite to said first and second fixed jaws, said cam jaws being mounted on generally parallel pivot axes extending generally transverse to and offset from said axis of the drill pipe receiving aperture, each of said jaws of the pair having a lever arm portion thereon, said lever arms being spaced apart, a pair of annular members surrounding said chuck body and in spaced position with respect to each other and disposed between said spaced apart lever arm portions of the jaws, biasing means between said annular members biasing the annular members and lever arms away from each other and urging rotation of the jaws to bring their cam surfaces into closer engagement with said pipe to force it against said fixed jaws, stop means for one of said cam jaws to limit rotary movement thereof in the direction of action urged by said biasing means, a pair of equalizers pivotally mounted on the chuck body in equalizing position with respect to said pair of rotatably mounted jaws and each equalizer having a lever arm portion extending over an adjacent one of said annular members and in engagement therewith, said equalizers being interconnected so that rotation of one towards the other or away from the other rotates the other respectively towards or away from the other, adjustably mounted stop means on said chuck body in line with a lever arm of one of said equalizers to limit same from movement in the direction of action of said biasing means between said annular members, and operating means connected with said rotatably mounted jaws to rotate same against said annular members and said biasing means therebetween to release the cam surface pressure grip on the pipe.

10. A chucking device for drill pipe and the like according to claim 9 wherein there is a plurality of paired fixed jaws and oppositely disposed thereto rotary jaws, equally spaced about the aperture and its axis through said chuck body for receiving said pipe and wherein said pair of equalizers is positioned intermediate two of said pairs of fixedly mounted jaws.

11. A chucking device for drill pipe and the like according to claim 10 including rotary mounting means for said chuck body.

12. A chucking device for drill pipe and the like according to claim 11 wherein said operating means comprises an annular member disposed in concentric position about the axis of said apertured chuck body, said last named annular member having an annular recess having a generally rectangular cross section extending from a face vertically into said member thereby forming an annular cylindrical recess, an annular piston received in said annular cylindrical recess and having actuating engagement with one of said lever arms of each pair of cam jaws which lies opposite to said stop means, and a fluid supply passage connected to said cylinder member and cylinder recess herein.

13. A chucking device for drill pipe and the like according to claim 12 wherein anti-friction means are disposed between said annular piston and said last mentioned cam jaw levers for action thereagainst while said chucking device may be rotating.

14. A chucking device for drill pipe and the like according to claim 13 wherein said anti-friction means comprises a bearing assembly having a pair of spaced frames or plates with anti-friction means therebetween.

15. A chucking device for drill pipe and the like comprising in combination, a chuck body having an aperture therethrough to receive said pipe, said aperture having an axis, a plurality of fixed jaws mounted in said body and extending into said aperture and against which said pipe may be gripped, a pair of cam jaws pivotally mounted in said body opposite each of said fixed jaws and extending into said aperture and having inter-engaging means thereon whereby said cam jaws pivot together, said cam jaws of each pair being mounted on generally parallel pivot axes extending generally transverse to and offset from said axis of the drill pipe receiving aperture, each pair of cam jaws having cam surfaces thereon which are adjacent said pipe to be gripped and on pivoting towards each other by said inter-engagement grip said pipe against said jaw means, biasing means urging said jaws to pivot on their pivotal mounting thereby gripping said pipe against said fixed jaw means, adjustably positionable stop means attached to said chuck body for one of said jaws and limiting rotary movement thereof in a set position in the direction of action of said biasing means, and operating means connected with said cam jaws to pivot the same jaws to release and set the grip on said pipe, said adjustable positionable stop means being movable separate and apart from said operating means to also release and set the grip of said cam jaws on said pipe.

16. A chucking device for drill pipe and the like according to claim 15 wherein said cam jaws have arms thereon and wherein said biasing means includes a pair of annular rings disposed between said arms on the jaws and about said chuck body and having spring elements therebetween urging said annular rings away from each other and into contact with said arms on the cam jaws, a pair of equalizers pivotally mounted on the chuck body in equalizing position with respect to said pair of rotatably mounted jaws and each having a lever arm portion extending over an adjacent one of said annular members and in engagement therewith, said equalizers being interconnected so that rotation of one towards the other or away from the other rotates the other respectively towards or away from the other, adjustably mounted stop means on said chuck body in line with a lever arm of one of said equalizers to limit same from movement in the direction of action of said spring element means between said annular members, said last mentioned adjustable stop means being also movable to move said annular members toward each other when said first adjustable stop means are used to release and set said cam jaw grip on said drill pipe.

References Cited in the file of this patent
UNITED STATES PATENTS

| | | |
|---|---|---|
| 920,820 | Brown | May 4, 1909 |
| 1,341,702 | Black | June 1, 1920 |
| 1,693,502 | Davis | Nov. 27, 1928 |
| 2,564,119 | Mathews et al. | Aug. 14, 1951 |